3,406,166
METHOD FOR PRODUCING RIBONUCLEOSIDE-
5'-PHOSPHATE
Toru Masuda, Nishinomiya, Mikio Honjo, Takatsuki, Shoichiro Fujii, Kyoto, Kinichi Imai, Takatsuki, and Kunio Takanohashi, Suita, Japan, assignors to Takeda Chemical Industries, Ltd., Osaka, Japan
No Drawing. Filed June 21, 1966, Ser. No. 559,105
7 Claims. (Cl. 260—211.5)

ABSTRACT OF THE DISCLOSURE

A method is provided for producing ribonucleoside-5'-phosphate from the corresponding ribonucleoside. The process comprises reacting the ribonucleoside with boron oxide, reacting the resulting product with a phosphorylating agent and subsequently hydrolyzing the thus phosphorylated product.

---

The present invention relates to a novel and useful method for producing ribonucleoside-5'-phosphate, which comprises reacting the corresponding ribonucleoside with boron oxide, then reacting the resulting product with a phosphorylating agent, and subsequently subjecting the so-phosphorylated product to hydrolysis.

The hitherto known methods for producing ribonucleoside-5'-phosphates starting with the corresponding ribonucleosides consist of protecting the 2'- and 3'-hydroxyl groups on the ribose moiety with acyl groups or the isopropylidene group and subsequently phosphorylating the free 5'-hydroxyl group by an appropriate agent, followed by removing the protecting group or groups and subjecting the radical introduced at the 5'-position to hydrolysis.

However, the hitherto known methods involve troublesome procedures for removing the protecting groups. For example, in case the protecting groups are acyl groups, a procedure with methanolic ammonia must be employed to remove the acyl groups, and in case the protecting group is an isopropylidene group, the phosphorylated product must be heated under acidic conditions to remove the isopropylidene group. These procedures are not only very troublesome but also give a relatively low yield of ribonucleoside-5'-phosphate. Therefore, these methods are disadvantageous from the technical point of view. Many attempts have been made to overcome the foregoing disadvantages, but none, so far as we are aware, has been entirely successful, at least from the viewpoint of industrial production.

It is an object of the present invention to provide a novel and industrially feasible method for the production of ribonucleoside-5'-phosphate from the corresponding ribonucleoside.

This object is realized by the present invention on the basis of the findings that the 3'- and 2'-OH groups of ribonucleoside are easily protected by reaction with boron oxide, that thus-protected ribonucleoside is selectively phosphorylated at the 5'-OH group, and that when so-phosphorylated product is subjected to hydrolysis for the purpose of hydrolyzing the radical, e.g. the

radical, introduced at the 5'-position, into the phosphono radical

the protecting groups are easily removed without the necessity of any other specific treatment for the removal.

The present invention thus enables the production of ribonucleoside-5'-phosphate in a good yield merely by subjecting the product resulting from the selective phosphorylation to hydrolysis without applying any specific treatment for removal of the protecting groups. The method of the present invention, thus, is much preferable to hitherto known methods from an industrial point of view because it requires no troublesome procedures for removing the protecting groups at the 2'- and 3'-positions of the ribose moiety and because of the relatively good yield of the product.

The present invention, concisely stated, comprises reacting ribonucleoside with boron oxide, then reacting the resulting product with phosphorylating agent, and subsequently subjecting the so-phosphorylated product to hydrolysis.

The ribonucleosides in the present invention are exemplified by those containing a purine base (e.g. adenosine, guanosine, inosine, etc.), those containing a pyrimidine base (e.g. uridine, cytisine, etc.) and those containing a pyridine base (e.g. nicotinic acid amide ribonucleoside, etc.) regardless of whether such ribonucleosides are naturally-occurring or synthetic.

In practicing the present invention, boron oxide is first reacted with the ribonucleoside. The amount of the boron oxide is generally about one mole to about 5 moles per mole of ribonucleoside. The reaction can be carried out at room temperature (about 15° to about 30° C.) or under heating, and is generally carried out at a temperature of about 30° C. to about 80° C.

The reaction is advantageously but not necessarily carried out in a solvent medium, and preferably in an organic solvent medium. Any solvent can be used as long as it does not hamper the reaction.

Solvents which can be used conveniently for the reaction, include, for example, alcohols (e.g. methanol, ethanol, ethylene glycol, etc.), ketones (e.g. acetone, methyl-ethyl ketone, etc.) cycloaliphatic hydrocarbons (e.g. dioxane, tetrahydrofuran, hexane, etc.), phenols (e.g. phenol, naphthol, cresol, ortho-chlorophenol, thymol, xylenol, etc.), halogenated hydrocarbons (e.g. carbon tetrachloride, etc.) acid amides (e.g. dimethylformamide), esters (e.g. ethyl acetate, butyl acetate, etc.), organic bases (e.g. pyridine, aldehyde collidine, etc.) and mixtures thereof.

Among these solvents, the phenols are most feasible. The solvent is used in an amount sufficient to dissolve the reaction mixture and practically in an amount of about 5 moles to about 10 moles per mole of ribonucleoside.

In the method of the present invention, the thus-resulting product is then subjected to phosphorylation, either after isolating the product or without isolation thereof. The phosphorylation is carried out by reacting the resultant product with a phosphorylating agent, for example, phosphorus oxychloride, phosphorus trichloride, tetrachloropyrophosphoric acid, phosphorus pentachloride, and hydrolysates thereof which are prepared by mixing water and the respective phosphorus compound, alcoholysates which are prepared by mixing ethanol and the respective phosphorus compound, etc.

The amount of the phosphorylating agent employed is not less than about one mole relative to the ribonucleoside and, practically, about 1 to 20 moles relative to the ribonucleoside.

The phosphorylation is advantageously but not necessarily carried out in a solvent medium, and most advantageously in an organic solvent. Any solvent can be used as long as it does not hamper the phosphorylation. Solvents which can be conveniently used for the phosphorylation, include, for example, ketones (e.g. acetone, methylethyl ketone, etc.), cycloaliphatic hydrocarbons (e.g. dioxane, tetrahydrofuran, hexane, etc.), phenols (e.g. phenol, naphthol, cresol, ortho-chlorophenol, thymol, xylenol, etc.), halogenated hydrocarbons (e.g. carbon tetrachloride, etc.), acid amides (e.g. dimethylformamide), esters (e.g. ethyl acetate, butyl acetate, etc.) organic bases (e.g. pyridine, aldehyde collidine, etc.) and mixtures thereof.

The temperature of the phosphorylation is generally between about 0° C. and about 60° C., advantageously between about 5° C. and about 25° C.

In the method of the present invention, the protecting reaction and the phosphorylation can be carried out in a single procedural step, for example, by stirring a mixture of ribonucloside, boron oxide and phosphorylating agent at about 5° C. for several hours in the presence or absence of a solvent.

The thus produced phosphorylated product is subsequently subjected to hydrolysis. This can be carried out in per se conventional manner, for example, by pouring the resultant mixture into water or an organic solvent containing water, preferably cool water, or by adjusting the pH value of the reaction mixture to a weakly acid area, desirably to about pH 1 to about pH 2 by adding an alkaline substance (e.g. sodium hydroxide, potassium hydroxide, sodium carbonate, potassium carbonate, etc.).

The desired ribonucleoside-5'-phosphate is thus produced.

The resulting final product, i.e. ribonucleoside-5'-phosphate, can be isolated from the reaction mixture by methods per se well known in the art, for example by means of ion-exchange resins or activated carbon, or by crystallizing it out in the form of salt, such as the sodium salt, potassium salt, barium salt, amino acid salt, etc.

By the method of the present invention, ribonucleoside-5'-phosphate can readily be obtained in high purity and good yield by a simple procedure.

For the purpose of giving those skilled in the art a better understanding of the present invention, the following illustrative examples of presently preferred embodiments are given. Parts are by weight unless otherwise indicated. The relation between parts by weight and parts by volume is the same as that between grams and milliliters. Percentages are by weight.

Example 1

A mixture of 3 parts of 2-chloro-inosine and 0.9 part of boron oxide was cooled to 5° C. To this mixture was added 20 parts by volume of tetrachloropyrophosphoric acid, and the reaction mixture was stirred at 5° C. for 3 hours. After the resulting reaction mixture was adjusted to pH 2 by pouring it into 1-normal aqueous solution of sodium hydroxide, it was adsorbed on a column packed with activated charcoal. The column was washed with 50 parts by volume of water and then eluted with 100 parts by volume of a mixture of ethanol and 28 percent aqueous solution of ammonia and water (the ratio of the mixture was 50:2:48 by volume). The eluate was concentrated. An analysis of the concentrate by means of paper electrophoresis in a citrate buffer solution of pH 5.8 showed that 2-chloroinosine-5'-phosphate was produced in a yield of 80 percent. To the concentrate was added a mixture of barium acetate and ethanol to give colorless powder of barium salt of 2-chloroinosine-5'-phosphate. Yield 3.9 parts (calculated as anhydride).

Elementary analysis as $C_{10}H_{10}O_8N_4ClPBa \cdot 5H_2O$: Calculated: C, 19.74; H, 3.32; N, 9.21; P, 5.10. Found: C, 19.93; H, 3.07; N, 8.78; P, 5.04.

$\lambda_{max.}^{0.1\ N-HCl}$ 253 m$\mu$ ($\epsilon = 11.4 \times 10^3$); $\lambda_{min.}^{0.1\ N-HCl}$ 224 m$\mu$ $\lambda_{max.}^{H_2O}$ 255 m$\mu$ ($\epsilon = 12.3 \times 10^3$); $\lambda_{min.}^{H_2O}$ 226 m$\mu$ $\lambda_{max.}^{0.1\ N-NaOH}$ 256 m$\mu$ ($\epsilon = 12.7 \times 10^3$); $\lambda_{min.}^{0.1\ N-NaOH}$ 227 m$\mu$ $[\alpha]_D^{25°} = -22°$ ($c. = 0.77$, $H_2O$)

Example 2

196 parts of inosine and 30 parts of boron oxide were added to 5600 parts by volume of meta-cresol and this mixture was stirred at 50° C. for 50 minutes to be solubilized. Then the solution thus obtained was cooled to 5° C., followed by adding thereto 560 parts of tetrachloropyrophosphoric acid to allow a reaction to take place at the same temperature for 2 hours. The reaction mixture was poured into ice water and extracted with benzene to remove meta-cresol from the reaction mixture, a benzene layer and an aqueous layer being formed. The benzene layer was washed with 6000 parts by volume of water and then, after removal of the aqueous layer, again with 4000 parts by volume of water. The aqueous layer and the washings were combined and the combined solution was extracted with benzene. The pH value of the thus-prepared aqueous layer was adjusted to 1 by adding a 5 normal aqueous solution of sodium hydroxide. (An analysis of the aqueous layer by means of paper electrophoresis in borate buffer solution at pH 9.2 showed that inosine-5'-phosphate was produced in a yield of 99.5 percent.) The aqueous solution was diluted to 50,000 parts by volume with water and passed through a column of 2000 parts of activated charcoal, which was then washed with water and eluted with 0.7 percent aqueous solution of sodium hydroxide. The eluate was adjusted to pH 8.6 by addition of hydrochloric acid and concentrated to give 234 parts (calculated as anhydride) of disodium salt of inosine-5'-phosphate. Yield: 81.5 percent.

Example 3

1.96 parts of inosine and 0.3 part of boron oxide were added to 75 parts by volume of meta-cresol. The mixture was heated at 50° C. to be solubilized and then cooled to 5° C., followed by adding 13.8 parts of phosphorus oxychloride to allow a reaction to take place under stirring at 5° C. for 6 hours. An analysis of the reaction mixture by means of paper electrophoresis showed that inosine-5'-phosphate was produced in a yield of 61.5 percent. The reaction mixture was treated after a similar procedure to that in Example 2 to give disodium salt of inosine-5'-phosphate. Yield 1.4 parts (calculated as anhydride).

Example 4

1.96 parts of inosine and 0.4 part of boron oxide were added to 75 parts by volume of meta-cresol. The mixture was heated at 50° C. to be solubilized and then cooled to 5° C.

A mixture of 50 parts of phosphorus oxychloride, 3 parts by volume of water and 35 parts of carbon tetrachloride was refluxed for 5 hours and the resulting mixture was subjected to distillation to give a residue having a boiling point of higher than about 90° C. at 10 millimeters Hg. The residue thus produced was added to the mixture prepared beforehand to allow a reaction to take place at 5° C. for 2 hours. An analysis of the reaction mixture by means of paper electrophoresis showed that inosine-5'-phosphate was produced in a yield of 98.3 percent. The reaction mixture was treated after a similar manner to that in Example 2 to give disodium salt of inosine-5'-phosphate. Yield 2.3 parts (calculated as anhydride).

Example 5

A mixture of 2.8 parts of guanosine, 0.7 part of boron oxide and 600 parts by volume of meta-cresol was stirred at 50° C. for an hour, whereby the guanosine was dissolved. The mixture was cooled to 5° C., followed by adding 20 parts by volume of tetrachloropyrophosphoric acid to allow a reaction to take place under stirring at 5° C. for 2 hours. (An analysis of the reaction mixture by means of paper electrophoresis showed that guanosine-5'-phosphate was produced in a yield of 85 percent.) The reaction mixture was treated after a similar procedure to that in Example 2 to give disodium salt of guanosine-5'-phosphate in a yield of 2.3 parts. Analysis of the crystals by means of paper electrophoresis (citrate buffer, at pH 5.8) and paper partition chromatography (ascending method using a mixture of isobutyric acid:0.5 normal aqueous solution of ammonia=10:6 by volume) showed that the migration distance and Rf value of the crystals were identical with those of guanosine-5'-phosphate.

The ratios of ultraviolet absorbancies of the crystals were as follows:

250 m$\mu$/260 m$\mu$=1.15, 280 m$\mu$/260 m$\mu$=0.65 and 290 m$\mu$/260 m$\mu$=0.28

The crystals were completely dephosphorylated by treatment with 5'-nucleotidase in bull semen.

Having thus disclosed the invention, what is claimed is:

1. A method for producing ribonucleoside-5'-phosphate from the corresponding ribonucleoside, which comprises reacting the ribonucleoside with boron oxide, phosphorylating the resulting product by reaction with phosphorylating agent, selected from the group consisting of phosphorus oxychloride, phosphorus trichloride, tetrachloropyrophosphoric acid, phosphorus pentachloride, and hydrolyzed phosphorus oxychloride, and subsequently hydrolyzing the so-phosphorylated product.

2. A method as claimed in claim 1, wherein the molar ratio of boron oxide to the ribonucleoside is about one to about 5, and the molar ratio of phosphorylating agent to the ribonucleoside is about one to about 20.

3. A method as claimed in claim 1, wherein the phosphorylating agent is phosphorus oxychloride.

4. A method as claimed in claim 1, wherein the phosphorylating agent is a hydrolyzate which is prepared by mixing phosphorus oxychloride and water.

5. A method as claimed in claim 1, wherein the ribonucleoside is inosine.

6. A method as claimed in claim 1, wherein the ribonuceloside is guanosine.

7. The method of claim 1 wherein the reaction with boron oxide is performed in solvent selected from the group consisting of methanol, ethanol, ethylene glycol, acetone, methyl ethyl ketone, dioxane, tetrahydrofuran, hexane, phenol, naphthol, cresol, ortho-chlorophenol, thymol, xylenol, carbon tetrachloride, dimethyl formamide, ethyl acetate, butyl acetate, pyridine and aldehyde collidine.

References Cited
UNITED STATES PATENTS

| | | | |
|---|---|---|---|
| 3,201,389 | 8/1965 | Fujimoto et al. | 260—211.5 |
| 3,231,561 | 1/1966 | Brunello et al. | 260—234 |
| 3,282,920 | 11/1966 | Ouchi et al. | 260—211.5 |
| 3,288,780 | 11/1966 | Tsuchiya et al. | 260—211.5 |

LEWIS GOTTS, *Primary Examiner.*

J. BROWN, *Assistant Examiner.*